(12) United States Patent
Kuehnemann et al.

(10) Patent No.: US 8,489,229 B2
(45) Date of Patent: Jul. 16, 2013

(54) METHOD AND DEVICE FOR AUTOMATED LOADING OF PACKAGES ON A LOAD CARRIER

(75) Inventors: Ralf Kuehnemann, Stadtbergen (DE); Lars Baldes, Augsburg (DE); Gerda Ruge, Ausburg (DE); Botond Goeroeg, Munich (DE)

(73) Assignee: Kuka Roboter GmbH, Augsburg (DE)

( * ) Notice: Subject to any disclaimer, the term of this patent is extended or adjusted under 35 U.S.C. 154(b) by 704 days.

(21) Appl. No.: 12/715,442

(22) Filed: Mar. 2, 2010

(65) Prior Publication Data
US 2010/0222915 A1    Sep. 2, 2010

(30) Foreign Application Priority Data
Mar. 2, 2009 (DE) ............... 10 2009 011 300

(51) Int. Cl.
*G06F 7/00* (2006.01)
(52) U.S. Cl.
USPC ........... 700/217; 700/230; 700/213; 700/215; 700/259; 700/305; 700/214
(58) Field of Classification Search
None
See application file for complete search history.

(56) References Cited

U.S. PATENT DOCUMENTS

| | | | | |
|---|---|---|---|---|
| 4,692,876 A | * | 9/1987 | Tenma et al. | 700/249 |
| 5,908,283 A | * | 6/1999 | Huang et al. | 414/801 |
| 2009/0306812 A1 | * | 12/2009 | Cottone et al. | 700/217 |
| 2010/0272547 A1 | * | 10/2010 | Cottone et al. | 414/426 |

FOREIGN PATENT DOCUMENTS
WO   WO 2008/083936   7/2008

OTHER PUBLICATIONS
U.S. Appl. No. 12/521,603.

* cited by examiner

*Primary Examiner* — Gene Crawford
*Assistant Examiner* — Yolanda Jones
(74) *Attorney, Agent, or Firm* — Schiff Hardin LLP

(57) ABSTRACT

A method and system for loading a loading carrier, in particular pallets, with packages by means of an automated manipulator, a model of a package stack on the loading carrier is automatically determined, an initial desired position for a package in the mode is determined, the package stack is detected on the loading carrier, a deviation between the detected package stack and the model is determined, the package is placed by the manipulator, and the steps are repeated until a termination criterion is reached.

16 Claims, 2 Drawing Sheets

METHOD AND DEVICE FOR AUTOMATED LOADING OF PACKAGES ON A LOAD CARRIER

BACKGROUND OF THE INVENTION

1. Field of the Invention

The present invention concerns a method and a system for loading a load carrier, in particular pallets, with packages by means of a manipulator, in particular a robot.

2. Description of the Prior Art

It is know, for example, from EP 1 211 203 B1 and DE 10 2007 001 263 A1 to load pallets by means of a robot. While, automatic palletizing machines are conventionally used for loading homogeneous pallets with identical packages, industrial robots are advantageous for loading pallets with different packages in a predetermined sequence (i.e. the consignment). All types of packaged goods, in particular individual goods or goods bundles, are designated as packages.

In both cases, a packing pattern that describes the desired positions of the individual packages on the load carrier is initially generated by a palletizing algorithm or an operator.

Automatic or semi-automatic palletizing algorithms are based on a mathematical-physical model of a package stack on which an additional package is to be placed. The model can include, for example, dimensions, weights, pressure distributions and center of gravity positions of the packages and the like for the packages that are already contained in the package stack, and can map these features to a placement position for the additional package. From DE 10 2007 001 263 A1 it is also known to determine a stability criterion that describes a static or dynamic stability of the stacked packages on the basis of such a model of the package stack.

The model deviates from the real package stack, in particular due to deformations of the real packages under the load of other packages in the package stack and due to deviations between the theoretical desired position and the actual real position of packages. This can lead to different disadvantages. The real package stack is most often smaller than the model due to weight-dependent compressions of the lower packages. If the palletizing algorithm now continues based on the model, the package stack may not be built up to its maximum allowable height since the algorithm has already incorrectly determined this has occurred based on the model. In this case the available space is not optimally used, which increases transport or storage costs.

Moreover, the desired positions cannot be approached exactly due to the deviations between model and real package stack since this could lead to collisions with real packages at positions that are not correctly mapped in the model. A known solution is to drop the packages at a sufficient distance above their desired position, but this disadvantageously increases the position inaccuracy and thus the deviations between the model and real package stack. The alternative use of force-regulated approach strategies is not possible for softer packages, since the contact force required for regulation would lead to intolerable deformations of the soft packages.

If the stability of the package stack is assessed on the basis of a model that deviates too significantly from the real package stack, this can similarly lead to a failure (collapse) of a stack that is incorrectly assessed as stable, the early ending of a stack construction that is incorrectly assessed as being no longer stable, or a non-optimal packing pattern.

SUMMARY OF THE INVENTION

An object of the present invention is to improve the loading of a load carrier with packages by means of a manipulator, and in particular to reduce or avoid one or more of the aforementioned disadvantages.

According to the invention, a model of a package stack that has already been constructed on the load carrier is determined for the automatic loading of said load carrier (in particular pallets) with packages by means of a manipulator (in particular a robot), wherein the model can map the loading area of the load carrier at the beginning of the construction. In particular a mathematical description of physical properties of the package stack—for example the dimensions, weights, pressure distributions and center of gravity positions of packages already contained in the package stack, possible placement surfaces for additional packages on the stack, a stability of the package stack or the like that can be implemented, for example, in data sets, tabular form, through links, in an object-oriented manner and/or as functions or relations—is in particular designated as a mathematical-physical model.

For one or more packages, an initial desired position is then initially determined which can advantageously ensue on the basis of the previously determined model.

According to the invention, the real package stack is detected [registered] before, while or after a package is now placed by the manipulator on the package stack described by the model. For this the package stack can, for example, be detected optically, in particular by means of one or more optical sensors and/or cameras. Additionally or alternatively, an acoustic detection (in particular by means of ultrasound sensors), a contact detection (in particular mechanically, for example by means of one or more spring sensors) and/or a different contact-free detection (for example by means of Reed contacts) is also possible. Laser sensors that determine the distance from surface points of the package stack to a sensor reference system (for example in a transmitted or reflected light method, for example according to the time-of-flight or delay principle) are particularly suitable as optical sensors.

If the sensor or sensors deliver point sets of surface points of the package stack, a surface of the package stack can be determined from these by means of trigonometric, statistical, graph theory and/or topological pattern recognition methods.

On the basis of the package stack detected in such a manner, according to the invention a deviation between this and the model can now be determined. Various problems explained in the preceding that result from the deviation between model and real package stack can be reduced or solved with the knowledge of this deviation.

For example, the model can be corrected or, respectively, better adapted to reality on the basis of the deviation between the detected package stack and the model. This can ensue through a learning method, in particular a monitored learning, a corroborative learning or an unmonitored, self-organizing learning. Neural networks (in particular with direct and/or indirect feedback) are particularly suitable for this and can, for example, be adapted by means of backwards propagation ("back-propagation") or error feedback. Other learning models (for instance observers) are also possible in addition to these.

If the model includes or is based on a database, the database can additionally or alternatively be adapted in that, for instance, links in a relational database are modified or a neural network modifies or trains the database.

Using a model adapted in such a manner, according to one aspect of the present invention the initial desired position for the placement of a package can be corrected before this is placed. Since the adapted model better approximates the real package stack, this corrected desired position corresponds better to the actual depositing position that can be taken up, such that packages can be dropped from a lower height or can be placed directly on the package stack with the manipulator, which not only increases the positioning accuracy but also enables a more gentle handling of the packages.

Additionally or alternatively, a corrected desired position for the package can also be determined directly based on the deviation between the detected package stack and the model. For example, if the model deviates from the real package stack by a specific value in terms of the height, the initial desired position can be corrected downwardly or upwardly by this value.

Using a model adapted in such a manner, according to another aspect of the present invention a more reliable stability criterion for the package stack can be determined. Additionally or alternatively, a stability criterion can also in turn be determined directly on the basis of the deviation between the detected package stack and the model. For example, if the real package stack deviates from the theoretical, stable model since portions of the package stack are unstable and begin to lean, a lack of stability of the real package stack can be concluded from this.

Such a deviation or instability can also similarly be determined via the comparison of the detected package stack at one point in time with the detected package stack at a preceding point in time, for example via comparison of images of the package stack at various points in time during its construction.

If the stability criterion (that is possible corrected on the basis of the deviation) falls below a limit value, the package is no longer placed on the stack by the manipulator at the initially determined desired position. A (corrected) stability criterion can preferably be taken into account in the determination of the corrected desired position for the package in that a different desired position is then determined or the package is placed on a different load carrier.

Packages can be classified according to their deformation, which was determined on the basis of the deviation between the detected package stack and the model. This classification can be taken into account in the model. For example, packages can be classified in two or more classes, for instance packages whose compression in a package stack does not exceed a defined limit value and packages that are more strongly compressed in the package stack. This modeling can be taken into account in a palletizing algorithm, for example in that packages that are more strongly compressed are allowed only in upper layers, or in that an average compression is accounted for in the model, for example for packages of one class.

A pressure or a pressure distribution in the package stack can advantageously also be reliably determined on the basis of the adapted model, and thus a damaging of packages or an instability can be prevented.

If multiple packages are loaded by the manipulator onto the load carrier, the aforementioned steps can be repeated for every package or even only for specific packages, for example cyclically if a specific package number is exceeded or a larger and/or heavier package is loaded.

The pallet is advantageously loaded with packages until a termination criterion is reached, for example a maximum allowable stack height, a minimum required stability criterion or the use of all packages to be stacked.

DESCRIPTION OF THE PREFERRED EMBODIMENTS

Figure 1:
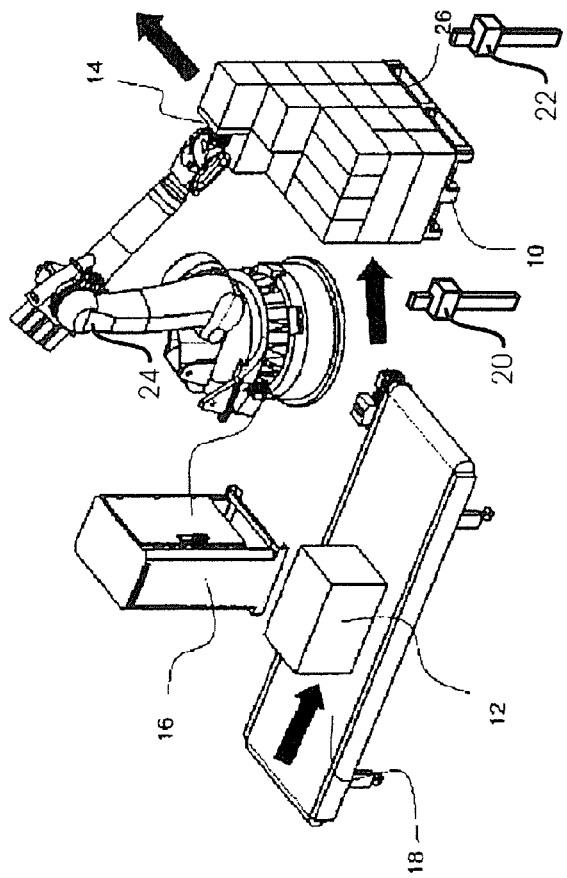
FIG. 1: schematically illustrates a system according to an embodiment of the present invention.

FIG. 1 shows a system according to an embodiment of the present invention for the loading of a pallet 10 with packages 12 that are delivered on a conveyor belt 18 by means of an industrial robot 24 that transports individual packages 12 with a gripper 14 from the conveyor belt 18 to a package stack 26 on the pallet 10 and places them there, and whose control device 16 is arranged in a separate control cabinet. In a modification (not shown), the robot controller can also be implemented in an industrial PC. A computer program according to the invention runs in an integrated or separate part of the control device 16.

Two laser sensors 20, 22 scan the surface of the package stack 26 and detect a group of three-dimensional coordinates of surface points from which a data-based pattern recognition in the control device 16 determines the surface contour of the package stack 26.

Figure 2:
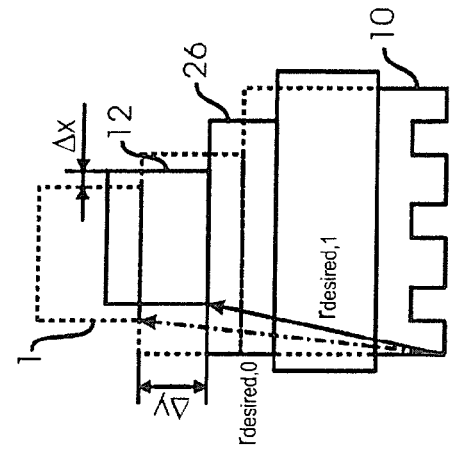
FIG. 2 shows a package stack for explaining the invention.

The principle forming the basis of the invention can be illustrated simply in FIG. 2. This shows in side view a three-layer package stack 26, wherein the real packages are shown distended. The theoretical positions and dimensions of the un-deformed packages are drawn in dashed lines as they are described by an unmodified model 1. It can be recognized that, due to the deformations of the underlying packages, the uppermost package 12 must be placed not in its initial desired position $r_{desired,0}$ but rather in a real desired position $r_{desired,1}$. In that the original theoretical model 1 (dashed lines in FIG. 2) is now adapted on the basis of a comparison with the detected, actual package stack 26 (distended in FIG. 2), a palletizing algorithm in the control device 16 can determine the correct desired position $r_{desired,1}$ corrected relative to the initial desired position $r_{desired,0}$, in which correct desired position $r_{desired,1}$ the robot 24 can then put down the package 12. Instead of determining the corrected desired position $r_{desired,1}$ on the basis of the adapted model 1, the initial desired position $r_{desired,0}$ can also be corrected directly by $\Delta x$, $\Delta y$ on the basis of the detected deviations between the original model 1 and the real package stack 26.

Figure 3:
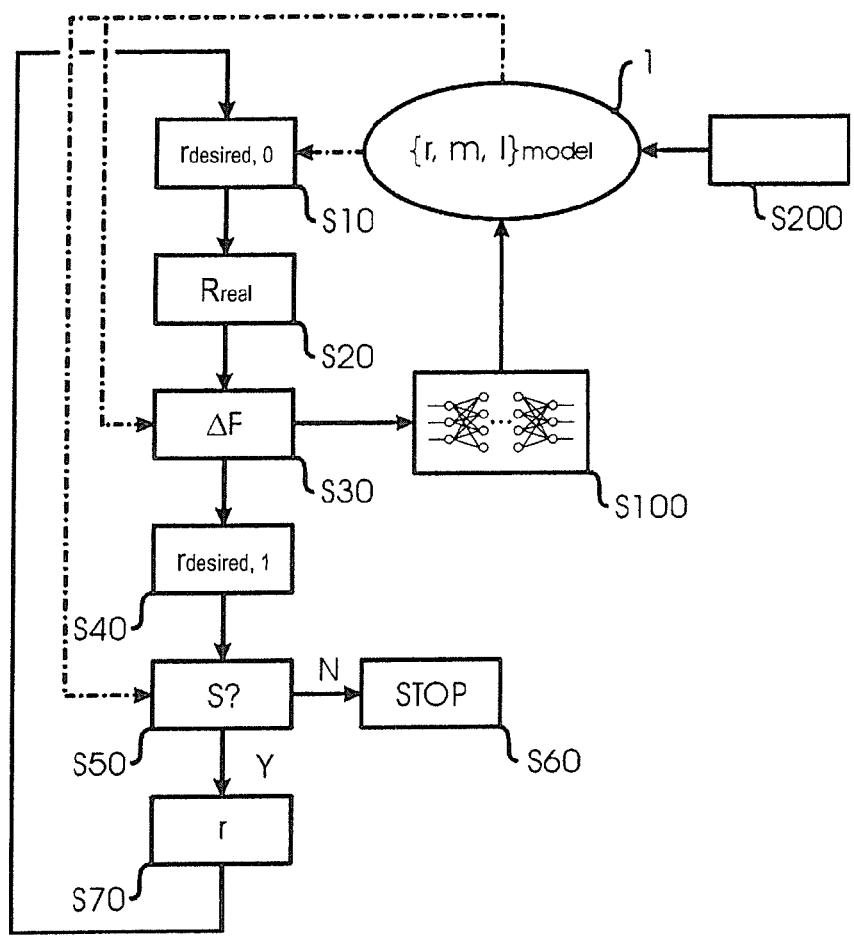
FIG. 3 is a flowchart of an embodiment of the method of the present invention.

The workflow of a method according to an embodiment of the present invention is drawn in FIG. 3: if an additional package should be loaded onto an already constructed package stack, an initial desired position rdesired,0 is initially determined in Step S10, advantageously on the basis of a mathematical-physical model (as indicated by a dash-dot arrow in FIG. 3). For this the model 1 was initialized once in advance in Step S200 in that, for example, weights, dimensions and center of gravity positions of un-deformed packages were provided which the model mapped to possible contact areas for additional packages, pressure distributions, stability criteria or the like.

Before the robot 24 places the additional package on the package stack, the real package stack 26 is detected in Step S20 using the two laser sensors 20, 22, as explained in the preceding. In particular a real surface contour $R_{real}$ of the actual package stack is hereby determined.

This is compared in Step S30 with a surface contour that results from the model 1, wherein a deviation $\Delta F$ between the detected package stack 26 and the model 1 is determined. This deviation can, for example, be maximum, minimum, average or weighted deviations of edges of the surface contour of the package stack in Cartesian coordinates.

Using this deviation, in Step S100 a database of the model 1 in the form of a neural network is adapted in that it is based on dimensions and center of gravity positions of the deformed packages of the real package stack 26, for example.

In Step S40 a corrected desired position $r_{desired,1}$ for the package is additionally determined on the basis of the deviation ΔF between the detected package stack and the model. This can ensue via, for example, direct correction of the initial desired position $r_{desired,0}$ by the values Δx, Δy, as explained in reference to FIG. 2. Step S10 can also similarly be repeated with the now-adapted model 1.

A stability criterion S is determined in Step S50 on the basis of the corrected or, respectively, adapted model 1 and compared with a limit value in order to assess whether the package stack 26 is probably stable with the additionally placed package 12. The stability can additionally or alternatively also be assessed directly on the basis of the deviation between the model of the un-deformed package stack or the package stack detected in a preceding step and the now detected, real, deformed and displaced package stack 26: if a larger deviation between the currently detected package stack and the original model or a preceding detected package stack results due to the packages beginning to lean, this can be assessed as a lack of stability.

If it is established in Step S50 that the package stack 26 is probably not sufficiently stable (S50: "N") given an additional package placed in the corrected desired position, the additional package is not placed at the corrected desired position; rather, either a new corrected desired position is determined under consideration of the stability criterion S or the loading of this package stack 26 is ended (S70).

By contrast, if a sufficient stability (S50: "Y") results in Step S50, in Step S70 the additional package is placed at the corrected desired position $r_{desired,1}$ and the method is repeated with the next package until all packages to be palletized are processed, a maximum allowable height of the pallet 10 is reached, or a minimum stability criterion at this is reached.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for automated loading of a load carrier with packages using an automated manipulator, comprising the steps of:
   in a processor, determining a model of an actual package stack on a load carrier to be loaded with packages to form said actual package stack;
   in said processor, determining a modeled desired position in said model for a modeled, added package, corresponding to an actual package to be added to said actual package stack, and updating said model to include said modeled, added package at said modeled desired position;
   from said processor, operating a manipulator to place said actual package at a placed position in said actual package stack on said load carrier that corresponds to said modeled, desired position;
   after placing said actual package at said placed position in said actual stack, automatically detecting said actual package stack on said load carrier and supplying a signal to the processor representing the detected package stack; and
   in said processor, determining whether a deviation exists between the detected actual package stack and the updated model and adapting said updated model dependent on said deviation.

2. A method as claimed in claim 1 comprising generating said model from a database in communication with said processor.

3. A method as claimed in claim 1 comprising adapting said updated model in said processor using an automated computerized learning method.

4. A method as claimed in claim 1 comprising, in said processor, determining a corrected modeled desired position for said modeled, added package dependent on said adapted model.

5. A method as claimed in claim 1 comprising determining said initialed modeled desired position for said package dependent on said model.

6. A method as claimed in claim 1 comprising, in said processor automatically determining a stability criterion for said package stack dependent on said adapted model.

7. A method as claimed in claim 1 comprising, in said processor, determining a corrected, modeled desired position for said modeled, added package dependent on said stability criterion for said package stack.

8. A method as claimed in claim 7 comprising controlling said manipulator from said processor to preclude said manipulator from placing said actual package at said modeled, desired position in said actual package stack on said load carrier if said stability criterion is below a stability limit value.

9. A method as claimed in claim 1 comprising, in said processor, classifying said packages dependent on their deformation, and determining said deformation from said deviation.

10. A method as claimed in claim 1 comprising optically detecting said actual package stack on said load carrier with an optical sensor system comprising a plurality of optical units selected from the group consisting of optical sensors and optical cameras.

11. A method as claimed in claim 1 comprising ultrasonically detecting said actual package stack on said load carrier.

12. A method as claimed in claim 1 comprising mechanically detecting said actual package stack on said load carrier.

13. A method as claimed in claim 1 comprising mathematically detecting said actual package stack on said load carrier by a mathematical technique selected from the group consisting of trigonometric techniques, statistical techniques, graph theory techniques, and topology techniques.

14. A method as claimed in claim 1 comprising determining a pressure that exists in said actual package stack on said load carrier from said model and said deviation.

15. An automated manipulator system for automated loading of a load carrier with packages comprising:
   an automated manipulator:
   a processor configured to determine a model of an actual package stack on a load carrier to be loaded with packages to form said actual package stack;
   said processor being configured to determine a modeled desired position in said model package stack for a modeled, added package, corresponding to an actual package to be added to said actual package stack, and to update said model to include said modeled, added package at said modeled desired position;
   said processor being configured to operate said manipulator to place said actual package at a placed position in said actual package stack on said load carrier that corresponds to said modeled, desired position;

a detector that automatically detects after placement of said actual package at said placed position in said actual stack, said actual package stack on said load carrier and supplies a signal to the processor representing the detected actual package stack on said load carrier; and said processor being configured to determine whether a deviation exists between the detected actual package stack and the updated model and to adapt said updated model dependent on said deviation.

16. A non-transitory computer-readable storage medium encoded with programming instructions, said storage medium being loaded into a computerized control unit of an automated manipulator system that also comprises an automated manipulator and a detector, and said programming instructions causing said computerized control unit to:

determine a model of an actual package stack on a load carrier to be loaded with actual packages to form said actual package stack;

determine a modeled desired position in said model for modeled, added package, corresponding to an actual package to be added to said actual package stack, and to update said model to include said modeled, added package at said modeled desired position;

operate said manipulator to place said actual package at a placed position in said actual package stack on said load carrier that corresponds to said modeled, desired position;

after placement of said actual package at said placed position in said actual stack, operate said detector to automatically detect said actual package stack on said load carrier and to supply a signal to the control unit representing the detected actual package stack; and determine whether a deviation exists between the detected actual package stack and the updated model and to adapt said updated model dependent on said deviation.

\* \* \* \* \*